United States Patent [19]

Frommlet et al.

[11] Patent Number: 4,547,127
[45] Date of Patent: Oct. 15, 1985

[54] WING MOUNTING FOR A ROTARY WING AIRCRAFT

[75] Inventors: Hubert Frommlet, Hoehenkirchen; Michael Hahn, Ottobrunn, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 544,563

[22] Filed: Oct. 24, 1983

[30] Foreign Application Priority Data

Nov. 11, 1982 [DE] Fed. Rep. of Germany ....... 3241754

[51] Int. Cl.[4] ............................................ B64C 27/38
[52] U.S. Cl. .................... 416/134 A; 416/141
[58] Field of Search ............... 416/134 A, 138 A, 141, 416/230 A, 140 A

[56] References Cited

U.S. PATENT DOCUMENTS

| | | | |
|---|---|---|---|
| 2,949,967 | 8/1960 | Jovanovich | 416/134 A |
| 3,556,673 | 1/1971 | Killian | 416/134 A |
| 3,778,189 | 12/1973 | Ferris | 416/140 A |
| 3,853,426 | 12/1974 | Rybicki | 416/140 A |
| 4,222,709 | 9/1980 | Mouille | 416/141 X |
| 4,227,859 | 10/1980 | Gouzien et al. | 416/134 A |
| 4,244,677 | 1/1981 | Noehren et al. | 416/134 A |
| 4,257,738 | 3/1981 | Schwarz et al. | 416/134 A |
| 4,273,511 | 6/1981 | Mouille et al. | 416/134 A |
| 4,297,078 | 10/1981 | Martin | 416/134 A |
| 4,299,538 | 11/1981 | Ferris et al. | 416/141 X |
| 4,342,540 | 8/1982 | Lovera et al. | 416/140 |
| 4,345,876 | 8/1982 | Schwarz | 416/230 A X |
| 4,352,632 | 10/1982 | Schwarz et al. | 416/141 X |
| 4,361,415 | 11/1982 | Aubrey | 416/134 A |
| 4,432,696 | 2/1984 | Stephan et al. | 416/134 A |

FOREIGN PATENT DOCUMENTS

| | | |
|---|---|---|
| 2829605 | 2/1979 | Fed. Rep. of Germany . |
| 2745468 | 4/1979 | Fed. Rep. of Germany . |
| 2827320 | 1/1980 | Fed. Rep. of Germany ... 416/134 A |
| 2919040 | 11/1980 | Fed. Rep. of Germany ... 416/134 A |
| 3021280 | 12/1981 | Fed. Rep. of Germany ... 416/204 R |

Primary Examiner—Everette A. Powell, Jr.
Attorney, Agent, or Firm—W. G. Fasse; D. H. Kane, Jr.

[57] ABSTRACT

A flexible blade neck of a helicopter rotor blade is bridged by a torsion rigid sleeve for the blade angle adjustments. The radially outer end of the blade neck and sleeve are rigidly connected to the wing section of the blade. The radially inner end of the blade neck forms a blade root which is secure to the rotor head or hub. Additionally, the radially inner ends of the blade root and of the sleeve are interconnected by a ball and socket arrangement permitting a universal movement between the sleeve and the blade neck, thereby decoupling sleeve movements from the blade neck and vice versa.

4 Claims, 3 Drawing Figures

WING MOUNTING FOR A ROTARY WING AIRCRAFT

FIELD OF THE INVENTION

The invention relates to a wing mounting for a rotary wing aircraft having a rotor head or hub with one or several radially outwardly directed rotor hub arms for the connection or mounting of a respective number of rotor blades to the rotor head or hub. The mounting is accomplished through, for example, two bolts extending through the hub arms and through respective blade root arms reaching into cooperation with the hub arms, whereby the connecting bolts extend through the thickness of the blade root in parallel to the rotational axis of the rotor head. The blade root continues radially outwardly into a blade neck section which is flexible at least relative to blade angle adjustment movements. The blade angle adjustment is accomplished by a sleeve bridging the blade neck section. The radially outer end of the blade neck and the radially outer end of the sleeve are rigidly connected to the wing section of the blade. The blade angle adjustment sleeve is torsion stiff, but may be flexible relative to other types of movements. The radially inner end of the blade root and of the sleeve are operatively interconnected.

DESCRIPTION OF THE PRIOR ART

A blade mounting of this type is disclosed in German Patent Publication No. (DE-OS) 2,829,605, corresponding to U.S. Pat. No. 4,273,511 wherein the pivotable connection between the blade angle adjustment sleeve and the blade root is accomplished by means of elastomeric bearing sections which support the sleeve relative to the upper and lower surface of the blade root over large surface areas. This type of structure has a substantial weight which is undesirable. Additionally, this type of structure requires substantial blade control forces or blade reset forces due to the relatively large inner bearing diameter. It is well known that large size bearings have a reduced operational life of the bearing segments. The larger the bearing, or rather its bearing diameter, the shorter is the useful life of such bearings.

OBJECTS OF THE INVENTION

In view of the above it is the aim of the invention to achieve the following objects singly or in combination:
- to substantially reduce the weight of a bearing of the type described while simultaneously requiring reduced reset or blade control forces for respectively increasing the useful life of the universal movement connection between the blade angle adjustment sleeve and the blade root;
- to provide a universal type movement connection between the radially inner end of the blade angle adjustment sleeve and the blade root which minimizes the bearing size while simultaneously avoiding any obstruction of the mounting of the blade to the rotor head; and
- to effectively decouple the flexible blade neck section or rather, movements thereof, from any movements of the blade angle adjustemnt sleeve and vice versa.

SUMMARY OF THE INVENTION

The blade mounting according to the invention comprises a ball and socket arrangement located in a recess of the blade root. The ball and socket arrangement includes a stud extending in axial alignment with the blade angle axis extending radially, and carries a ball or ball section which is axially movable on the stud. The ball or ball section in turn is held in a socket or ring type mounting member which is also located in said recess. In one embodiment the stud is secured to the radially inner end of the blade root and the socket or ring member is secured to the radially inner end of the blade angle adjustment sleeve. In another embodiment the stud carrying the ball or ball section is secured to the sleeve while the socket or ring member is secured to the blade root.

This type of ball and socket bearing between the sleeve and the blade root and its specifically claimed positioning in a recess of the blade root satisfies the requirement for minimizing the size of the bearing as well as the requirement for relatively small blade angle adjustment forces or reset forces. This type of mounting also has the advantage that it does not interfere at all with the connection of the blade root arms to the flange arms of the rotor head.

BRIEF DESCRIPTION OF DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
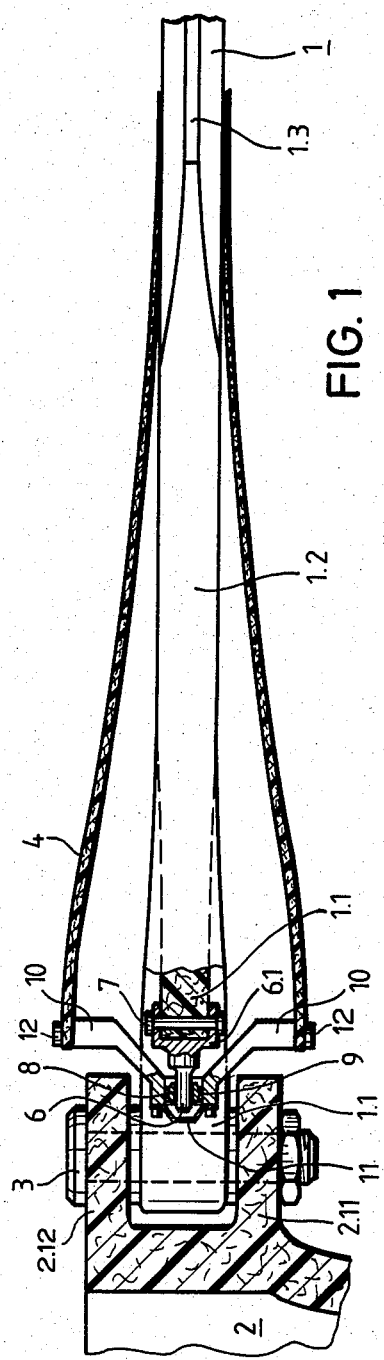
FIG. 1 is a sectional view through a rotor head with the blade mounting, whereby the section extends vertically in the direction of the rotary axis of the hub.
Figure 2:
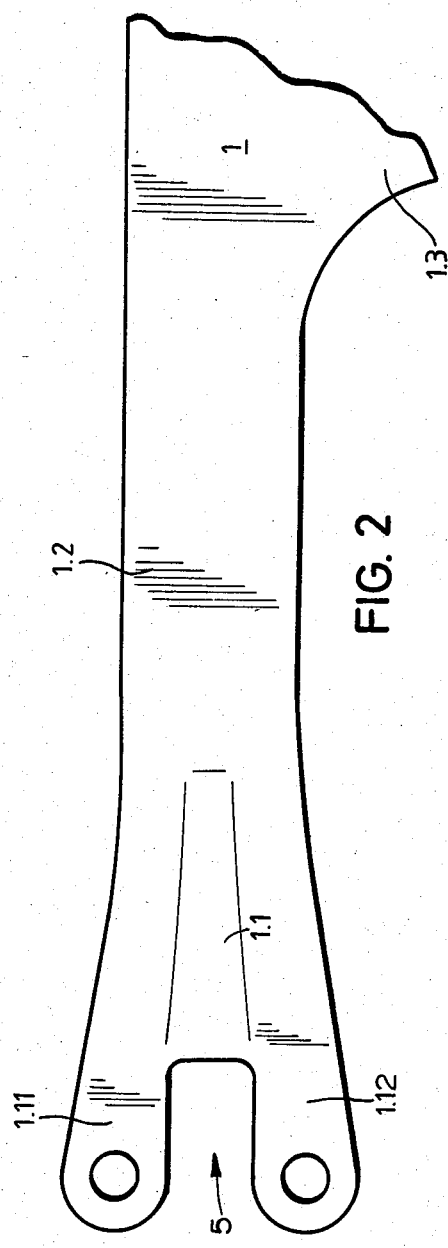
FIG. 2 shows a top plan view of the blade root and blade neck section of a helicopter rotor blade suitable for the present purposes.

FIG. 1 shows a rotor blade 1 having a blade root 1.1, a blade neck section 1.2 and a wing section 1.3. The neck section 1.2 is flexible relative to lead-lag and flapping movements to form a hingeless rotor. The blade root is provided with two mounting arms 1.11 and 1.12 forming a recess 5 therebetween. The arms 1.11 and 1.12 reach into a gap between two flange arms 2.11 and 2.12 of a rotor head or hub 2. Bolts 3 extending in parallel to the rotational axis of the rotor hub pass through holes in the flange arms 2.11 and 2.12 as well as in the root arms 1.11 and 1.12. Only one bolt 3 is seen because the other bolt is in front of the plane of the drawing.

In order to make possible that in such a so-called rigid or hingeless rotor the wing section 1.3 of the rotor blade 1 may be adjusted to take up the proper blade or pitch angle, the blade neck secton 1.2 is flexible relative to torsional loads. Such torsional flexibility of the blade neck section 1.2 may, for example, be achieved by making the neck section 1.2 relatively long and constructing the neck section of fiber strands having a unidirectional fiber orientation extending substantially in parallel to the radial longitudinal blade axis.

The blade angle adjustment movements are accomplished by a blade angle adjustment sleeve 4 extending around the neck section 1.2. The blade angle adjustment sleeve 4 is stiff against torsional loads to accomplish said blade angle adjustments by a conventional linkage not shown, but secured to the radially inner end of the sleeve 4. The radially outer end of the sleeve 4 is rigidly connected to the radially inner end of the wing section 1.3 and encloses the neck section entirely along its length. The radially inner end of the sleeve 4 extends all the way to and around the blade root section. The linkage for the blade angle adjustment may, for example, be connected externally to the radially inner end of the sleeve 4 by means of a fork member not shown.

Figure 3:
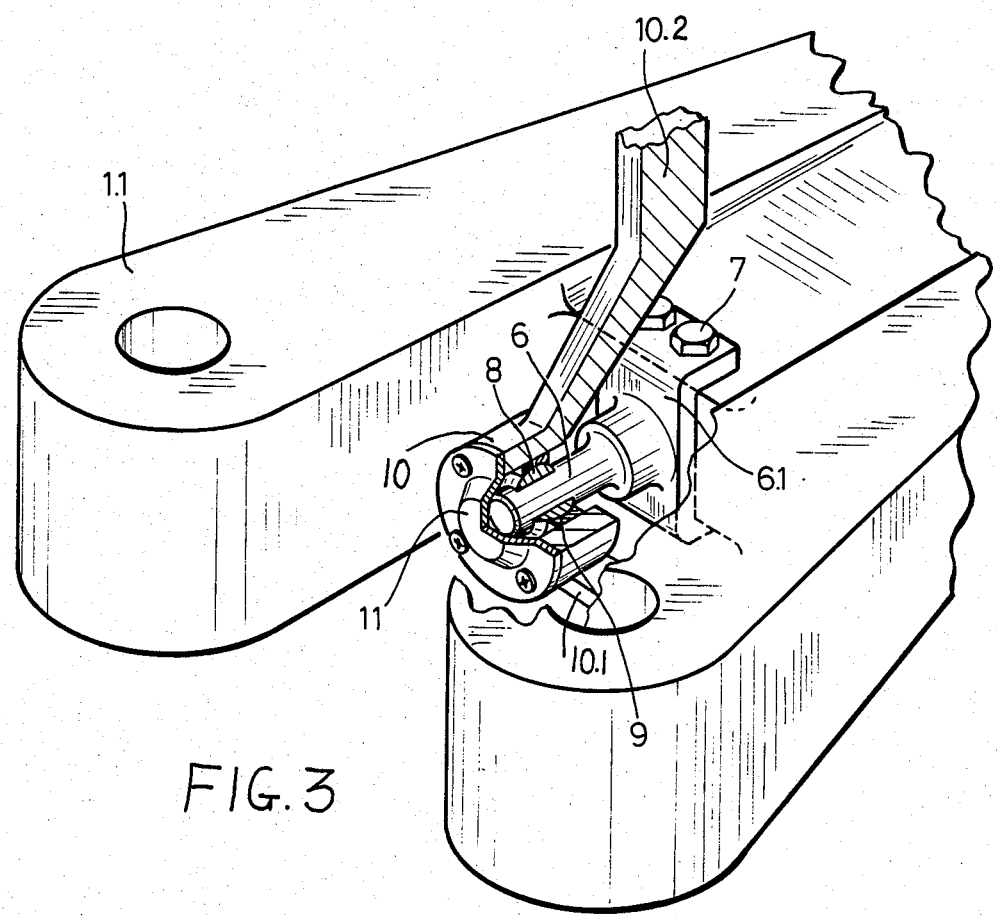
FIG. 3 is a perspective view of the present blade mounting.

The radially inner end of the sleeve 4 is operatively connected to the radially inner end of the blade root 1.1 by a universal movement permitting pivot coupling means which effectively prevents any feedback effects in both directions. In other words, movements of the neck section 1.2 are effectively decoupled from the sleeve and the movements of the sleeves 4 are effectively decoupled from the neck section. For this purpose the invention provides a ball and socket type pivoting coupling which is secured to the radially inner end of the sleeve 4 and to the blade root 1.1 example, by a bracket 10 and a stud 6. The pivoting coupling includes a socket 10 with two bracket arms 10.1 and 10.2 for connecting the socket 10 to the sleeve 4. The pivoting coupling further comprises a stud 6 secured to the blade root 1.1 and a ball section 8 slidably held for axial movement on the free end of the stud 6. A ball ring member 9 holds the ball section 8 in the socket 10 which is closed by a cover member 11. The stud 6 itself is secured by a fork 6.1 and bolt means 7 to the blade root 1.1. The outer ends of the bracket arms 10.1 and 10.2 of the socket 10 are secured to the sleeve 4 by bolts 12, please see FIGS. 1 and 3 together.

This type of construction provides for a universal movement between the sleeve and neck section while involving a minimal structural effort, yet assuring an optimal connection safety and load take-up ability substantially without any limitation regarding the useful life of this type of coupling structure. Moreover, by locating the coupling in the recess 5 between the mounting arms 1.11 and 1.12 of the blade root 1.1, the copuling does not interfere with the securing of the blade root arms to the flange arms of the hub 2. The recess 5 could be replaced with a hole in the blade root also without interfering with the mounting of the blade root to the rotor hub.

The stud 6 is removably secured because the above mentioned fork 6.1 may be released by withdrawing the bolt 7, whereby maintenance work is facilitated.

As shown, the socket 10 may have several arms 10.1 and 10.2 interconnected by a central ring member provided with a fitting diameter hole for receiving the ball ring member 9. It is also possible to secure the stud 6 with its ball section to the sleeve 4 and provide the blade root with a socket or race for receiving the ball section of the stud 6. The operation would be the same.

Although the invention has been described with reference to specific example embodiments, it will be appreciated, that it is intended, to cover all modifications and equivalents within the scope of the appended claims.

What is claimed is:

1. A wing mounting for a rotary wing aircraft, comprising a rotor head including a rotor and a number of blades secured to said rotor head, each blade having a longitudinal blade axis extending substantially radially relative to said rotor head, each blade including a radially outer wing section, a radially intermediate torsion yielding neck section, a radially inner blade root section having a recess (5) therein, and a sleeve bridging said neck section for blade angle adjustments, said sleeve being rigidly connected with its radially outer end to a radially inner end of said wing section, means operatively connecting said blade root section to said rotor head, and pivot means operatively located in said recess (5) for universally joining a radially inner end of said sleeve to a radially inner end of said blade root section, said pivot means comprising socket means, ball means operatively held in said socket means, and means operatively mounting said ball and socket means between said radially inner end of said sleeve and said blade root section, said mounting means including a stud having a longitudinal stud axis substantially coinciding with said longitudinal blade axis, said ball means being arranged for axially sliding on said stud reaching into said socket means for permitting a universal movement between said radially inner end of said sleeve and said blade root section.

2. The mounting of claim 1, wherein said stud is rigidly secured to said radially inner end of said blade root section, and wherein said mounting means further include bracket means rigidly secured at one end thereof to said radially inner end of said sleeve and holding at the other end thereof said socket means in which said ball means are operatively received for said axial sliding on said stud to permit said universal movement.

3. The mounting of claim 2, wherein said mounting means further comprise a forked bracket having secured thereto said stud, and means rigidly securing said forked bracket to said radially inner end of said blade root section.

4. The mounting of claim 1, wherein said blade root section is divided into two mounting arms, said recess being formed between said mounting arms of said blade root section.

* * * * *